US011606126B2

United States Patent
Jeon et al.

(10) Patent No.: US 11,606,126 B2
(45) Date of Patent: Mar. 14, 2023

(54) ELECTRONIC DEVICE INCLUDING ANTENNA DEVICE

(71) Applicant: Samsung Electronics Co., Ltd., Gyeonggi-do (KR)

(72) Inventors: Seunggil Jeon, Gyeonggi-do (KR); Jaeyoung Huh, Gyeonggi-do (KR); Younghwa Kim, Gyeonggi-do (KR); Hyunchul Hong, Gyeonggi-do (KR)

(73) Assignee: Samsung Electronics Co., Ltd

( * ) Notice: Subject to any disclaimer, the term of this patent is extended or adjusted under 35 U.S.C. 154(b) by 40 days.

(21) Appl. No.: 17/437,709

(22) PCT Filed: Dec. 27, 2019

(86) PCT No.: PCT/KR2019/018545
§ 371 (c)(1),
(2) Date: Sep. 9, 2021

(87) PCT Pub. No.: WO2020/184822
PCT Pub. Date: Sep. 17, 2020

(65) Prior Publication Data
US 2022/0158704 A1 May 19, 2022

(30) Foreign Application Priority Data
Mar. 12, 2019 (KR) .................. 10-2019-0027892

(51) Int. Cl.
*H04B 7/06* (2006.01)
*H04B 17/12* (2015.01)
(Continued)

(52) U.S. Cl.
CPC ............ *H04B 7/0617* (2013.01); *H01Q 3/26* (2013.01); *H04B 1/401* (2013.01); *H04B 17/12* (2015.01); *H04B 17/318* (2015.01)

(58) Field of Classification Search
CPC ...... H04B 7/0617; H04B 1/401; H04B 17/12; H04B 17/318; H04B 1/40; H04B 5/0025;
(Continued)

(56) References Cited

U.S. PATENT DOCUMENTS 8,550,991 B2   10/2013  Nam
9,342,172 B2    5/2016  Choi
(Continued)

FOREIGN PATENT DOCUMENTS

KR        10-0944519       3/2010
KR      10-2013-0032226    4/2013
(Continued)

OTHER PUBLICATIONS

International Search Report dated Apr. 28, 2020 issued in counterpart application No. PCT/KR2019/018545, 5 pages.
(Continued)

*Primary Examiner* — Fitwi Y Hailegiorgis
(74) *Attorney, Agent, or Firm* — The Farrell Law Firm, P.C.

(57) ABSTRACT

Disclosed is an electronic device including a housing, an antenna device including at least one antenna element disposed on one surface or inside of a printed circuit board disposed inside the housing and a radio frequency integrated chip (RFIC) for processing a signal in a frequency band, which is transmitted and/or received through the at least one antenna element, a communication circuit, a memory, and a processor configured to detect an external object, which contacts at least part of the housing, based on a change in a beam pattern of a beam formed by the antenna device, determine whether at least some information of the external object is information included in registration object data stored in the memory, and change the beam pattern by using first compensation data, which is stored in the registration
(Continued)

object data and which is changed depending on a registration structure corresponding to the external object when the at least some information of the external object is included in the registration object data.

15 Claims, 13 Drawing Sheets

(51) Int. Cl.
    *H04B 17/318* (2015.01)
    *H01Q 3/26* (2006.01)
    *H04B 1/401* (2015.01)

(58) Field of Classification Search
    CPC ........ H01Q 3/26; H01Q 1/243; H01Q 3/2605; H01Q 9/0407; H01Q 21/08; H01Q 25/002; H04M 1/02; H04M 1/0249; H04M 1/0277
    USPC .......................................................... 375/262
    See application file for complete search history.

(56) References Cited

U.S. PATENT DOCUMENTS

| | | | |
|---|---|---|---|
| 9,560,183 B2 | 1/2017 | Kari et al. | |
| 10,191,455 B2 | 1/2019 | Shim et al. | |
| 10,381,710 B1* | 8/2019 | Kuo | ..................... H01Q 1/2266 |
| 10,530,040 B2 | 1/2020 | Cai et al. | |
| 10,579,181 B2 | 3/2020 | Lee et al. | |
| 10,891,006 B2 | 1/2021 | Ahn | |
| 2012/0056664 A1 | 3/2012 | Nam | |
| 2012/0229258 A1* | 9/2012 | Lim | ................... G06K 7/10128 |
| | | | 340/10.1 |
| 2014/0240253 A1 | 8/2014 | Choi | |
| 2015/0373180 A1 | 12/2015 | Kari et al. | |
| 2017/0093023 A1 | 3/2017 | Cai et al. | |
| 2018/0039233 A1 | 2/2018 | Shim et al. | |
| 2018/0210600 A1 | 7/2018 | Lee et al. | |
| 2018/0239459 A1 | 8/2018 | Ahn | |
| 2020/0083595 A1 | 3/2020 | Cai et al. | |

FOREIGN PATENT DOCUMENTS

| | | |
|---|---|---|
| KR | 10-2014-0107949 | 9/2014 |
| KR | 10-2017-0002596 | 1/2017 |
| KR | 10-2018-0016866 | 2/2018 |
| KR | 10-2018-0087527 | 8/2018 |
| WO | WO 2017/034289 | 3/2017 |

OTHER PUBLICATIONS

Written Opinion dated Apr. 28, 2020 issued in counterpart application No. PCT/KR2019/018545, 5 pages.

\* cited by examiner

ELECTRONIC DEVICE INCLUDING ANTENNA DEVICE

CROSS-REFERENCE TO RELATED APPLICATIONS)

This application is a National Phase Entry of PCT International Application No. PCT/KR2019/018545, which was filed on Dec. 27, 2019, and claims priority under 35 U.S.C. § 119 to Korean Patent Application No. 10-2019-0027892, which was filed on Mar. 12, 2019, in the Korean Intellectual Property Office, the entire contents of each of which is incorporated herein by reference.

BACKGROUND

1. Field

The present disclosure relates to an electronic device including an antenna device.

2. Description of the Related Art

As mobile communication technologies develop, an electronic device equipped with an antenna device is widely supplied. The electronic device may transmit and/or receive a radio frequency (RF) signal including a voice signal or data (e.g., a message, a photo, a video, a music file, or a game) by using the antenna device. The electronic device may perform communication by using a high frequency such as 5G millimeter wave.

When high-frequency communication is performed, an antenna array structure including a plurality of antenna elements may be applied to overcome a high transmission loss. The antenna array structure includes a patch antenna structure or a dipole antenna structure, which is capable of beamforming. The characteristics of the antenna device may be affected depending on a structure of housing and/or placement locations of antenna elements.

Meanwhile, an external object may be formed around the electronic device. The external object may be arranged to contact at least part of an external surface of the electronic device. For example, an external surface of the electronic device may be coupled to a case for protecting the electronic device. The case may include a tag or a radio frequency identifier (RFID). The electronic device may recognize the type (e.g., a case in which a front surface and a rear surface are integrated with each other, a rear case, a border case, or a case having an asymmetric structure) or model name of the case by using near field communication (NFC). The electronic device may control a theme, lighting, and/or an always on display (AOD) screen of the electronic device in response to a structure of the recognized case. As another example, when another object contacts an external surface of the electronic device or a user grips the electronic device, an external object may be formed around the electronic device.

When 5G millimeter wave is used in an electronic device, characteristics of an antenna device or beam patterns of beams formed by the antenna device may be changed depending on a shape, material, and placement shape of the external object by straightness and/or transmission loss. Changes in the characteristics of the antenna device may include a reflection loss or phase shift that is caused by the relative permittivity of the external object. Changes in beam patterns may include a change in a coverage area caused by a non-uniform external object or a change in a beam shape caused by a movement of a null point.

When characteristics of the antenna device or beam patterns formed by the antenna device are changed, the electronic device may be controlled to operate while satisfying radiation characteristics required to perform wireless communication, by modifying a beam book and/or gain so as to correspond to the changed characteristic. However, when various external objects such as various types of cases, other objects, or a user's grip, contact a surface of the electronic device, various changes may occur in radiation characteristics, and thus it is not easy to restore a beam pattern in response to all the various changes.

SUMMARY

Aspects of the disclosure discussed herein provide a method of changing a beam pattern in response to an event that a beam pattern formed by an antenna device is changed by an external object, and an electronic device to which the method is applied.

According to an aspect of the disclosure, an electronic device may include a housing, an antenna device including at least one antenna element disposed on one surface or inside of a printed circuit board disposed inside the housing and a radio frequency integrated chip (RFIC) for processing a signal in a frequency band, which is transmitted and/or received through the at least one antenna element, a communication circuit, a memory, and a processor operationally connected to the antenna device, the communication circuit, and the memory. The processor may be configured to detect an external object, which contacts at least part of the housing, based on a change in a beam pattern of a beam formed by the antenna device, to determine whether at least some information of the external object is information included in registration object data stored in the memory, and to change the beam pattern by using first compensation data, which is stored in the registration object data and which is changed depending on a registration structure corresponding to the external object when the at least some information of the external object is included in the registration object data.

According to an aspect of the disclosure, a method of changing a beam pattern of an antenna device may include detecting an external object, which contacts at least part of a housing of an electronic device, based on a change in a beam pattern formed by the antenna device, determining whether at least some information of the external object is information included in registration object data stored in a memory of the electronic device, and changing the changed beam pattern by using first compensation data, which is set the registration object data and which is used to compensate for the change of the beam pattern due to a registration structure when the at least some information of the external object is included in the registration object data.

According to an aspect of the disclosure, an electronic device may include a housing, an antenna device disposed inside the housing and including at least one antenna element disposed on one surface or inside a printed circuit board and an RFIC that processes a signal in a frequency band, which is transmitted and/or received through the at least one antenna element, at least one sensor sensing an operating state of the electronic device or an external environment state, a communication circuit, a memory, and a processor operationally connected to the antenna module, the at least one sensor, the communication device, and the memory. The processor may be configured to sense a shape and/or type of an external object contacting at least part of the housing by using the at least one sensor, to determine whether at least some information of the external object is stored in the memory, to control a beam pattern formed by the antenna device by using a beam hook and/or a gain control value included in a first compensation data according to a registration structure corresponding to the external object when the at least some information of the external object is stored in the memory, to calculate a change degree of the beam pattern by using a reflection signal obtained as a signal output by the antenna device is reflected from the external object and is input to the antenna device when the at least some information of the external object is not stored in the memory, and to control the beam pattern by generating second compensation data corresponding to the change degree.

According to embodiments of this disclosure, a beam pattern may be restored substantially the same as a beam pattern in a case where there is no external object, by changing the beam pattern in response to an event that a beam pattern formed by an antenna device is changed by an external object.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of drawings, the same or similar components will be marked the same or similar reference signs.

DETAILED DESCRIPTION

Various embodiments of the disclosure may be described with reference to accompanying drawings. However, those of ordinary skill in the art will recognize that modifications, equivalents, and/or alternatives of various embodiments described herein may be variously made without departing from the scope and spirit of the disclosure.

Figure 1:
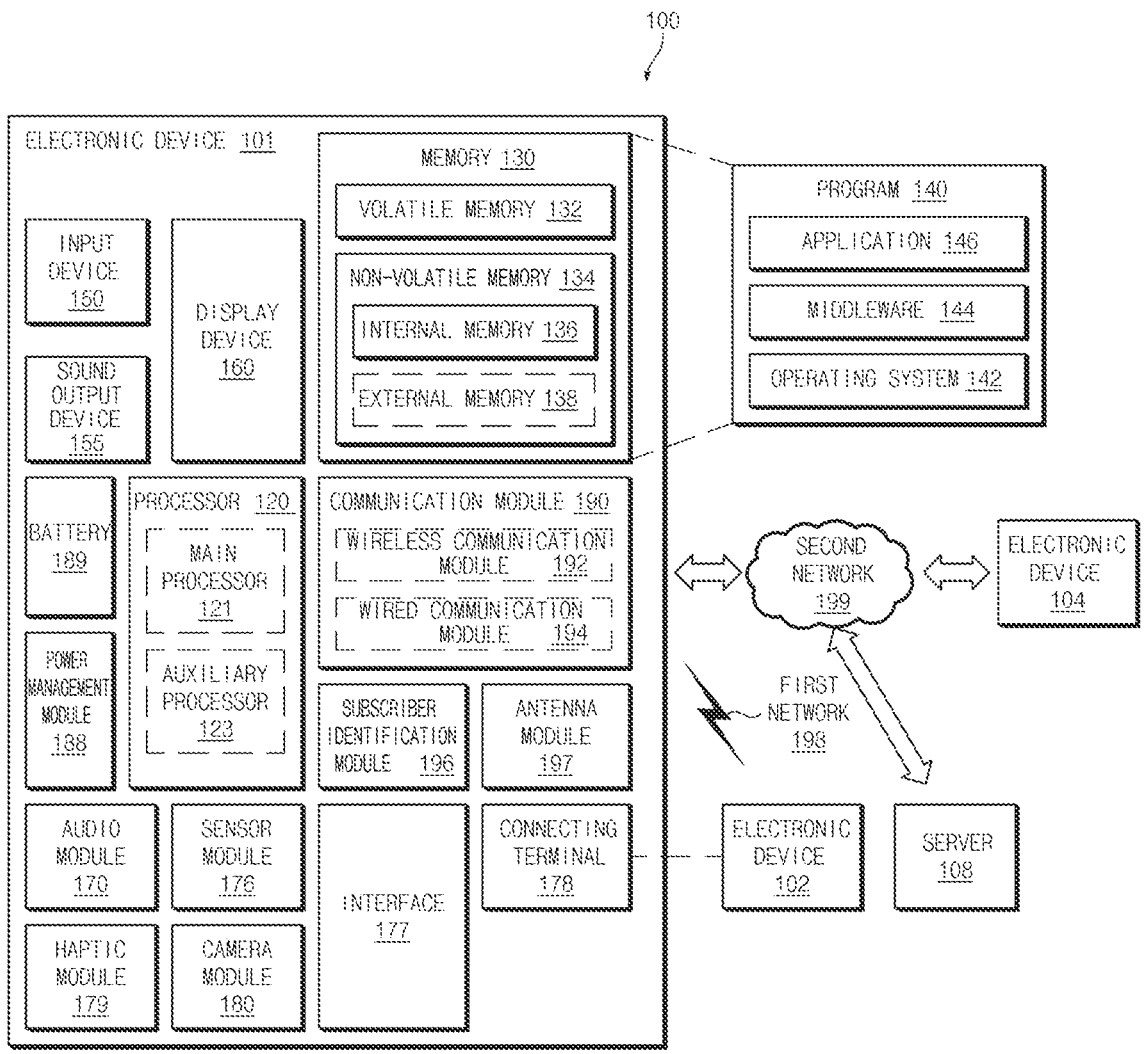
FIG. 1 is a block diagram illustrating an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently fro or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least sonic of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry-processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
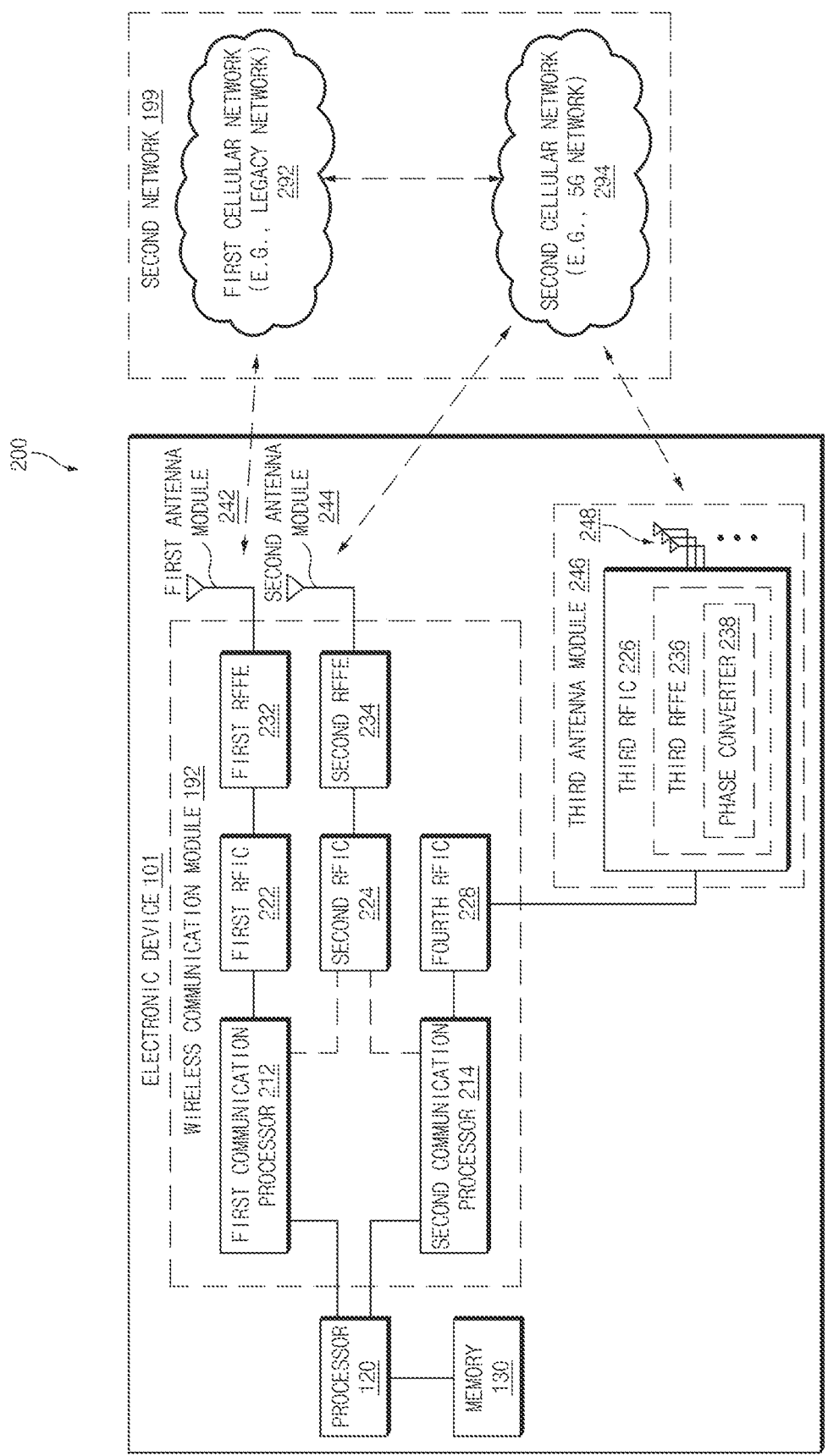
FIG. 2 is a block diagram of an electronic device for supporting legacy network communication and 5G network communication, according to an embodiment.

FIG. 2 is a block diagram 200 of the electronic device 101 for supporting legacy network communication and 5G network communication, according to an embodiment.

Referring to FIG. 2, the electronic device 101 may include a first communication processor 212, a second communication processor 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. The electronic device 101 may further include components other than those in FIG. 1, and the network 199 may further include at least another network. The first communication processor 212, the second communication processor 214, the first RFIC 222, the second RFIC 224, the fourth RFIC 228, the first RFFE 232, and the second RFFE 234 may form at least part of the Bless communication module 192. The fourth RFIC 228 may be omitted or may be included as a part of the third RFIC 226.

The first communication processor 212 may establish a communication channel for a band to be used for wireless communication with the first network 292 and may support legacy network communication through the established communication channel. The first network may be a legacy network including a 2nd generation (2G), 3G, 4G, or a long term evolution (LTE) network. The second communication processor 214 may establish a communication channel corresponding to a specified band (e.g., ranging from approximately 6 GHz to approximately 60 GHz) of bands to be used for g tireless communication with the second network 294 and may support 5G network communication through the established communication channel. According to various embodiments, the second network 294 may be a 5G network defined in 3GPP. Additionally, the first communication processor 212 or the second communication processor 214 may establish a communication channel corresponding to another specified band (e.g., approximately 6 GHz or lower) among the bands to be used for wireless communication with the second network 294 and may support 5G network communication through the established communication channel. The first communication processor 212 and the second communication processor 214 may be implemented within a single chip or a single package. The first communication processor 212 or the second communication processor 214 may be implemented within a single chip or a single package together with the processor 120, the auxiliary processor 123, or the communication module 190.

In the case of transmitting a signal, the first RFIC 222 may convert a baseband signal generated by the first communication processor 212 into a radio frequency (RF) signal of approximately 700 MHz to approximately 3 GHz that is used in the first network 292 (e.g., a legacy network). In the case of receiving a signal, an RF signal may be obtained from the first network 292 (e.g., a legacy network) through an antenna (e.g., the first antenna module 242) and may be preprocessed through an RFFE (e.g., the first RFFE 232). The first RFIC 222 may convert the preprocessed RF signal to a baseband signal so as to be processed by the first communication processor 212.

In the case of transmitting a signal, the second RFIC 224 may convert a baseband signal generated by the first communication processor 212 or the second communication processor 214 into an RF signal (hereinafter referred to as a "5G Sub6 RF signal") in a Sub6 band (e.g., approximately 6 GHz or lower) used in the second network 294 (e.g., a 5G network). In the case of receiving a signal, the 5G Sub6 RF signal may be obtained from the second network 294 (e.g., a 5G network) through an antenna (e.g., the second antenna module 244) and may be preprocessed through an RFFE (e.g., the second RFFE 234). The second RFIC 224 may convert the preprocessed 5G Sub6 RF signal into a baseband signal so as to be processed by a corresponding communication processor of the first communication processor 212 or the second communication processor 214.

The third RFIC 226 may convert a baseband signal generated by the second communication processor 214 into an RF signal (hereinafter referred to as a "5G Above6 RF signal") in a 5G Above6 band (e.g., approximately 6 GHz to approximately 60 GHz) to be used in the second network 294 (e.g., a 5G network). In the case of receiving a signal, the 5G Above6 RF signal may be obtained from the second network 294 (e.g., a 5G network) through an antenna (e.g., the antenna 248) and may be preprocessed through a third RFFE 236. The third RFIC 226 may convert the preprocessed 5G Above 6 RF signal to a baseband signal so as to be processed by the second communication processor 214, The third RFFE 236 may be implemented as a part of the third RFIC 226.

The electronic device 101 may include the fourth RFIC 228 independently of the third RFIC 226 or as at least a part of the third RFIC 226, In this case, the fourth RFIC 228 may convert a baseband signal generated by the second communication processor 214 into an RF signal (hereinafter referred to as an "IF signal") in an intermediate frequency band (e.g., approximately 9 GHz to approximately 11 GHz) and may provide the IF signal to the third RFIC 226. The third RFIC 226 may convert the IF signal to the 5G Above6 RF signal. In the case of receiving a signal, the 5G Above6 RF signal may be received from the second network 294 (e.g., a 5G network) through an antenna (e.g., the antenna 248) and may be converted into an IF signal by the third RFIC 226. The fourth RFIC 228 may convert the IF signal into a baseband signal to be processed by the second communication processor 214.

The first RFIC 222 and the second RFIC 224 may be implemented as at least a part of a single package or a single chip. The first RFFE 232 and the second RFFE 234 may be implemented as at least part of a single chip or a single package. At least one of the first antenna module 242 or the second antenna module 244 may be omitted or may be combined with any other antenna module to process RF signals its a plurality of bands.

The third RFIC 226 and the antenna 248 may be disposed on the same substrate to form the third antenna module 246. For example, the wireless communication module 192 or the processor 120 may be disposed at a first substrate (e.g., a main PCB). In this case, the third RFIC 226 may be disposed in a partial region (e.g., a bottom surface) of a second substrate (e.g., sub PCB) separately of the first substrate; the antenna 248 may be disposed in another partial region (e.g., an upper surface), and thus the third antenna module 246 may be formed. The antenna 248 may include, for example, an antenna array capable of being used for beam forming. As the third RFIC 226 and the antenna 248 are disposed at the same substrate, it may be possible to decrease a length of a transmission line between the third RFIC 226 and the antenna 248. For example, the decrease in the transmission line nay make it possible to prevent a signal in a high-frequency band (e.g., approximately 6 GHz to approximately 60 GHz) used for the 5G network communication from being lost (or attenuated) due to the transmission line. As such, the electronic device 101 may improve the quality or speed of communication with the second network 294 (e.g., a 5G network).

The second network 294 (e.g., a 5G network) may be used independently of the first network 292 (e.g., a legacy network) (e.g., stand-alone (SA)) or may be used in conjunction with the first network 292 (e.g., non-stand alone (NSA)). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., the Internet) under control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130 so as to be accessed by any other component (e.g., the processor 120, the first communication processor 212, or the second communication processor 214).

Figures 3A, 3B:
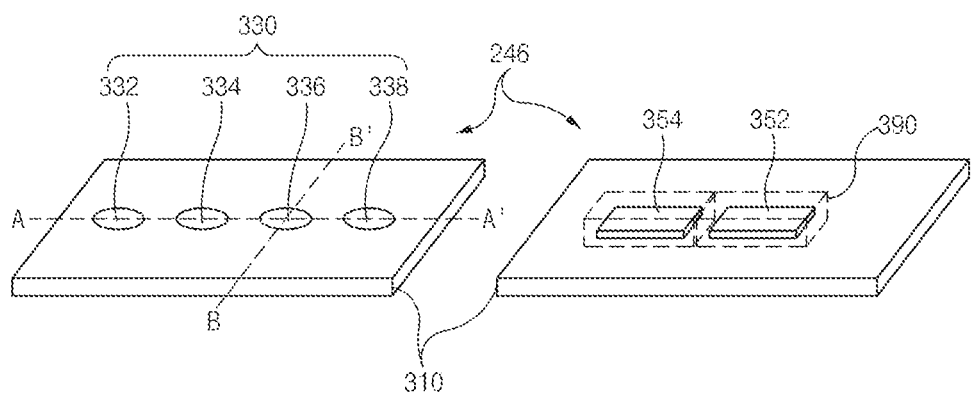
FIGS. 3A to 3C illustrate a third antenna module described with reference to FIG.
Figure 3C:
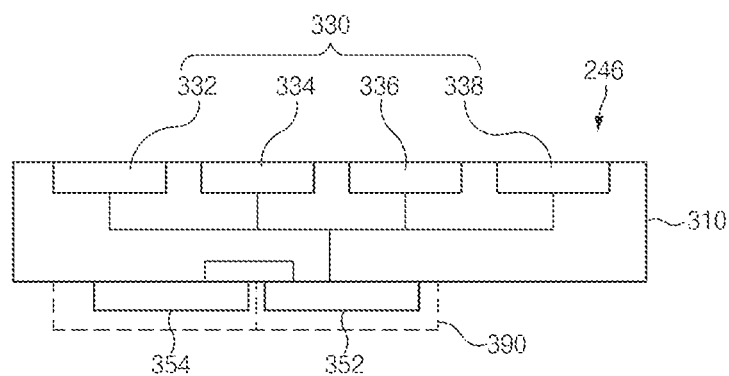

FIGS. 3A to 3C illustrates an embodiment of the third antenna module 246 described with reference to FIG. 2, for example. FIG. 3A is a perspective view of the third antenna module 246 when viewed from one side, and FIG. 3B is a perspective view of the third antenna module 246 when viewed from another side. FIG. 3C is a cross-sectional view of the third antenna module 246 taken along line A-A' of FIG. 3A.

Referring to FIG. 3, in an embodiment, the third antenna module 246 may include a printed circuit board 310, an antenna array 330, an RFIC 352, a PMIC 354, and a module interface, Selectively, the third antenna module 246 may further include a shielding member 390, At least one of the above components may be omitted, or at least two of the components may be integrally formed.

The printed circuit board 310 may include a plurality of conductive layers and a plurality of non-conductive layers, and the conductive layers and the non-conductive layers may be alternately stacked. The printed circuit board 310 may provide an electrical connection between the printed circuit board 310 and/or various electronic components disposed on the outside by using wires and conductive vias formed in the conductive layers.

The antenna array 330 may include a plurality of antenna elements 332, 334, 336, and 338 disposed to form a directional beam. As shown, the antenna elements may be formed on a first surface of the printed circuit board 310. The antenna array 330 may be formed within the printed circuit board 310. The antenna array 330 may include a plurality of antenna arrays (e.g., a dipole antenna array and/or a patch antenna array) that are identical or different in shape or kind.

The RFIC 352 may be disposed on another region (e.g., a second surface facing away from the first surface) of the printed circuit board 310 so as to be spaced from the antenna array. The RFIC is configured to process a signal in a selected frequency band, which is transmitted/received through the antenna array 330. In the case of transmitting a signal, the RFIC 352 may convert a baseband signal obtained from a communication processor into an RF signal in a specified band. In the case of receiving a signal, the RFIC 352 may convert an RF signal received through the antenna array 330 into a baseband signal and may provide the baseband signal to the communication processor.

In the case of transmitting a signal, the RFIC 352 may up-convert an IF signal (e.g., approximately 9 GHz to approximately 11 GHz) obtained from an intermediate frequency integrated circuit (IFIC) into an RF signal. In the case of receiving a signal, the RFIC 352 may down-convert an RF signal obtained through the antenna array 330 into an IF signal and may provide the IF signal to the IFIC.

The PMIC 354 may be disposed on another region (e.g., the second surface) of the printed circuit board 310, which is spaced from the antenna array. The PMIC may be supplied with a voltage from a main PCB and may provide a power necessary for various components (e.g., the RFIC 352) on an antenna, module.

The shielding member 390 may be disposed at a portion (e.g., on the second surface) of the printed circuit board 310 such that at least one of the RFIC 352 or the PMIC 354 is electromagnetically shielded. The shielding member 390 may include a shield can.

The third antenna module 246 may be electrically connected with another printed circuit board (e.g., a main circuit board) through a module interface. The module interface may include a connection member, for example, a coaxial cable connector, a board to board connector, an interposer, or a flexible printed circuit board (FPCB). The RFIC 352 and/or the PMIC 354 of the antenna module may be electrically connected with the printed circuit board 310 through the connection member.

Figure 4:
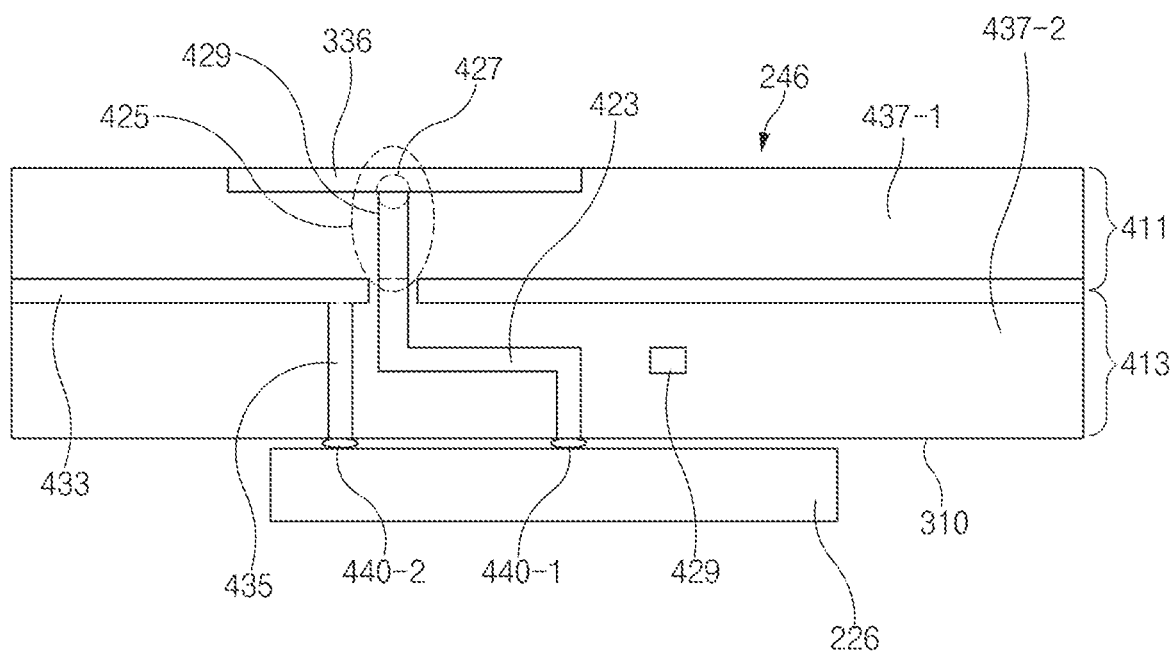
FIG. 4 illustrates a cross-sectional view of a third antenna module taken along a line A-A' of FIG. 3.

FIG. 4 illustrates a cross-sectional view of the third antenna module 246 taken along a line B-B' of FIG. 3A. In an embodiment illustrated, a printed circuit board 310 may include an antenna layer 411 and a network layer 413.

The antenna layer 411 may include at least one dielectric layer 437-1, and an antenna element 336 and/or a feeding part 425 formed on an outer surface of the dielectric layer 437-1 or therein. The feeding part 425 may include a feeding point 427 and/or a feeding line 429.

The network layer 413 may include at least one dielectric layer 437-2 and at least one ground layer 433, at least one conductive via 435, a transmission line 423, and/or a signal line 429 formed on an external surface of the dielectric layer 437-2 or therein.

In addition, the third RFIC 226 of FIG. 2 may be electrically connected with the network layer 413, for example, through first and second connection parts (e.g., solder bumps) 440-1 and 440-2. In other embodiments, various connection structures (e.g., soldering or a ball grid array (BOA)) may be utilized instead of the connection part. The third RFIC 226 may be electrically connected with the antenna element 336 through the first connection part 440-1, the transmission line 423, and the feeding part 425. Also, the third. RFIC 226 may be electrically connected to the ground layer 433 through the second connection part 440-2 and the conductive via 435. Furthermore, the third RFIC 226 may also be electrically connected with the above module interface through the signal line 429.

Figure 5:
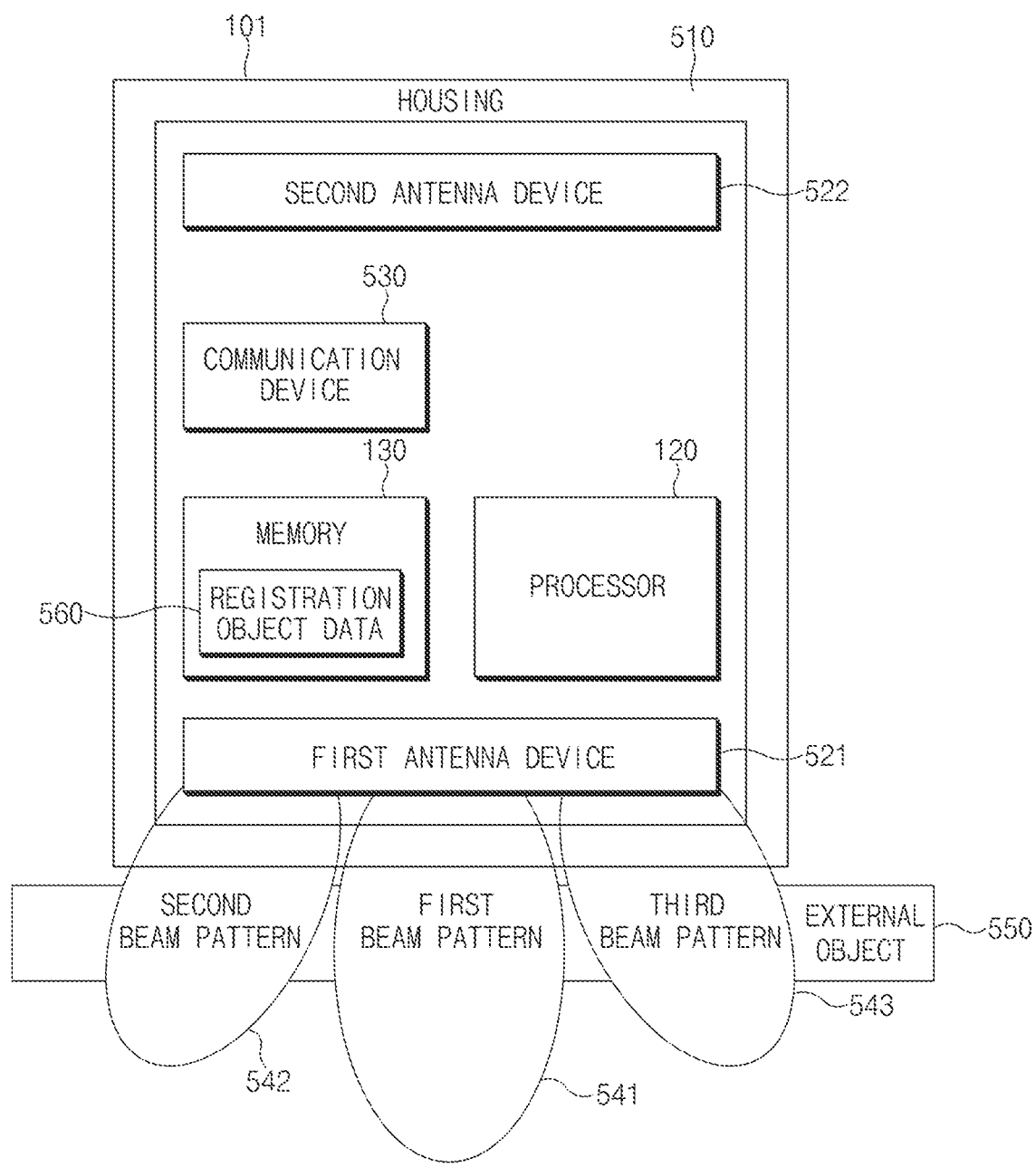
FIG. 5 illustrates antenna devices of an electronic device forming beam patterns while the electronic device contacts an external object, according to an embodiment.

FIG. 5 illustrates antenna devices 521 and 522 of the electronic device 101 forming beam patterns 541, 542, and 543 while the electronic device 101 contacts an external object 550, according to an embodiment. The electronic device 101 may include housing 510, the first and second antenna devices 521 and 522, respectively, a communication device 530, the memory 130, and the processor 120.

The housing 510 may define a shape of the electronic device 101. The housing 510 may be formed to surround surfaces of the electronic device 101. A printed circuit board (PCB) may be positioned inside the housing 510.

The first and second antenna devices 521 and 522 may be positioned inside the housing 510. Each of the antenna devices 521 and 522 may include at least one antenna element and an RFIC. The at least one antenna element may be positioned on one surface or inside of the PCB. The RFIC may process a signal in a frequency band, which is transmitted and/or received through the at least one antenna element.

The first antenna device 521 may transmit and/or receive a signal in a first frequency band. The first antenna device 521 may form the beam patterns 541, 542, and 543 to transmit and/or receive a signal in the first frequency band. The second antenna device 522 may be positioned spaced from the first antenna device 521. The second antenna device 522 may transmit and/or receive a signal in a second frequency band different from the first frequency band.

The communication device 530 may establish a communication channel such that the electronic device 101 performs wireless communication. The communication device 530 may be an IFIC) or a CP.

The memory 130 may store information necessary for the electronic device 101 to operate. The memory 130 may store information associated with signals or beam patterns, which are emitted by the antenna devices 521 and 522. The memory 130 may store, as registration object data 560, information corresponding to at least part of information of the external object 550 capable of being coupled to the electronic device 101. For example, the memory 130 may store, as the registration object data 560, pieces of information associated with a genuine product among cases, which are coupled or attached to at least part of an external surface of the electronic device 101 so as to protect the housing 510 of the electronic device 101.

The processor 120 may be operationally connected to the antenna devices 521 and 522, the communication device 530, and the memory 130. The processor 120 may be configured such that the antenna devices 521 and 522 emit a signal of a specified frequency. The processor 120 may change the beam patterns 541, 542, and 543 by using information associated with the registration object data 560 stored in the memory 130. The first antenna device 521 may form the beam patterns 541, 542, and 543 for transmitting and/or receiving signals. For example, the first antenna device 521 may form the first beam pattern 541, the second beam pattern 542, and/or the third beam pattern 543, Each of the first beam pattern 541, the second beam pattern 542, and/or the third beam pattern 543 may have a shape in which each of the first beam pattern 541, the second beam pattern 542, and/or the third beam pattern 543 that passes through the external object 550 radiates and/or diverges toward the outside of the electronic device 101.

The external object 550 may be positioned adjacent to the housing 510, The external object 550 may be coupled to the housing 510 so as to cover at least part of an external surface of the housing 510. The external object 550 may have an asymmetric or non-uniform shape. The external object 550 may be a non-conductive dielectric. The intensity and/or phase of a signal transmitted and/or received by the first antenna device 521 may be changed by the external object 550. The external object 550 may change and/or distort the shape of the first beam pattern 541, the second beam pattern 542, and/or the third beam pattern 543.

The registration object data 560 may include data associated with an extent to which the beam patterns 541, 542, and 543 are changed, and/or data for compensating for the extent to which the beam patterns 541, 542, and 543 are changed. The beam patterns 541, 542, and 543 changed by the external object 550 may be changed by using the data included in the registration object data 560. For example, the beam patterns 541, 542, and 543 may be restored to be substantially the same as the beam patterns 541, 542, and 543 before the external object 550 is coupled, by compensating for the change and/or distortion of each of the beam patterns 541, 542, and 543 changed by the external object 550 by using the data included in the registration object data 560.

Figure 6:
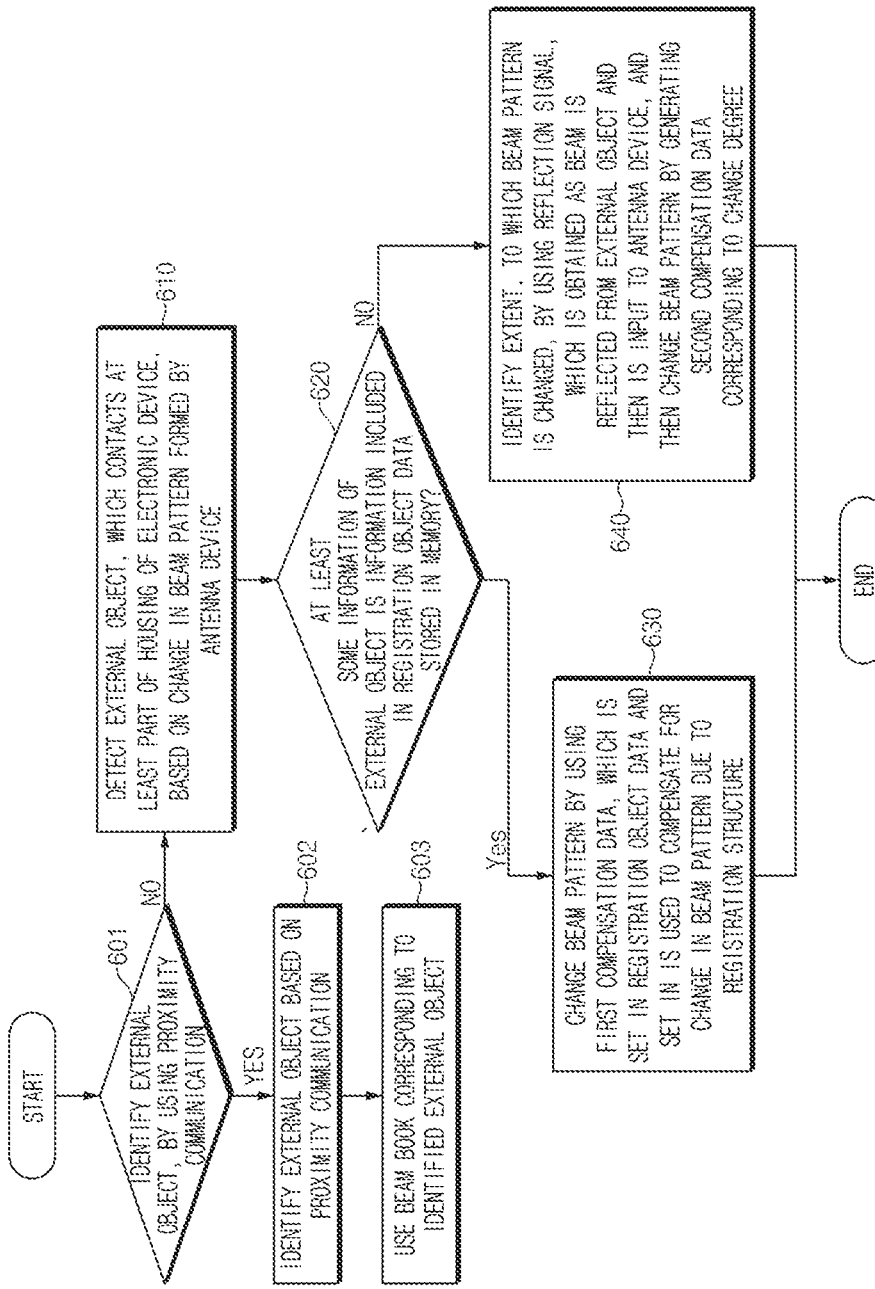
FIG. 6 is a flowchart illustrating a method of changing beam patterns of antenna devices, according to an embodiment.

FIG. 6 is a flowchart illustrating a method of changing beam patterns 541, 542, and 543 of the antenna devices 521 and 522, according to an embodiment.

In step 601, the electronic device 101 may identify the external object 550 through proximity communication. The electronic device 101 may identify the type of the external object 550 by using near field communication (NFC). For example, the electronic device 101 may determine whether the external object 550 is a case. The electronic device 101 may determine whether the external object 550 is a genuine case, through the NFC. When the electronic device 101 identifies the external object 550 through the proximity communication (step 601—Yes), the method may proceed to step 602. When the electronic device 101 fails to identify the external object 550 through the proximity communication (step 601—No), the method may proceed to step 610.

In step 602, the electronic device 101 may identify the external object 550 based on the proximity communication. When the external object 550 is a genuine case, the electronic device 101 may identify the type (e.g., a case in which a front surface and a rear surface are integrated with each other, a rear case, a border case, or a case having an asymmetric structure) or model name/number of the case.

In step 603, the electronic device 101 may use a beam book corresponding to the identified external object 550. The memory 130 of the electronic device 101 may store beam books corresponding to the type or model name of a case. When the external object 550 is a genuine case, the processor 120 may load, from the memory 130, a beam book corresponding to the type or model name of the case. The electronic device 101 may change the beam patterns 541, 542, and 543 by using the beam book.

In step 610, the electronic device 101 may detect the external object 550, which contacts at least part of the housing 510 of the electronic device 101, based on changes in the beam patterns 541, 542, and 543 formed by the antenna devices 521 and 522. For example, the electronic device 101 may measure a communication status of the communication device 530 and then may identify that the beam patterns 541, 542, and 543 are changed. When the communication status of the communication device 530 is changed or the reception sensitivity of the communication device 530 is weakened, the processor 120 may determine that the beam patterns 541, 542, and 543 are changed. As another example, the electronic device 101 may detect the shape and/or type of the external object 550, which contacts at least part of the housing 510, by using at least one sensor, which is included in the sensor module 176 and which detects an operating state of the electronic device 101 or an external environmental state. When the sensor detects contact shape information and/or pressure information associated with the external object 550, the processor 120 may determine whether the external object 550 is a case, another object, or a user's grip.

In step 620, the electronic device 101 may detect whether at least some information of the external object 550 is included in information stored in the registration object data 560 stored in the memory 130 of the electronic device 101. The processor 120 may compare an extent to which the beam patterns 541, 542, and 543 caused by the external object 550 are changed, with an extent to which the beam patterns 541, 542, and 543 by information included in the registration object data 560 are changed. The processor 120 may determine whether the external object 550 is included in the registration object data 560, based on information measured by the communication device 530 and/or at least one sensor. For example, the processor 120 may determine whether the external object 550 corresponds to one of genuine cases included in the registration object data 560.

When at least some information of the external object 550 is included in the registration object data 560, in step 630, the electronic device 101 may change the beam patterns 541, 542, and 543 by using first compensation data, which is stored in the registration object data 560, which corresponds to the external object 550, and which is according to a registration structure. The registration structure may be structures, which are preset in by the registration object data, from among structures capable of becoming the external object 550. The registration structure may be a structure, which is adjacent to or in contact with the electronic device 101, defined by the registration object data 560. For example, the registration structure may be a hypothetical structure, which is capable of being implemented by the registration object data 560 and which is capable of approaching the electronic device 101. The registration structure may correspond to an external object expressed by the registration object data 560. The first compensation data may be compensation data stored in the memory 130 so as to compensate for the beam patterns 541, 542, and 543 that are changed when the registration structure is coupled to the housing 510 of the electronic device 101. The first compensation data may be mapped into the registration object data 560 so as to correspond to the registration object data 560 one-to-one. Accordingly, the first compensation data may be set to offset the distortion caused by the registration structure. Accordingly, when at least some information of the external object 550 is information included in the registration object data 560, changes and/or distortion of the beam patterns 541, 542, and 543 changed by the external object 550 may be compensated by applying the first compensation data. Accordingly, the beam patterns 541, 542, and 543 may be restored to be similar to the beam patterns 541, 542, and 543 before the external object 550 is coupled.

When pieces of information associated with the external object 550 are not included in the registration object data 560, in step 640, the electronic device 101 may identify an extent to which the beam patterns 541, 542, and 543 are changed, by using a reflection signal, which is obtained as a beam is reflected from the external object 550 and then is input to the antenna devices 521 and 522, and then may change the beam patterns 541, 542, and 543 by generating second compensation data corresponding to the degree of change. The processor 120 may generate the second compensation data for compensating for the beam patterns 541, 542, and 543 changed by the external object 550 having a structure other than the registration structure 560, The processor 120 may use the reflection signal, which is obtained as a beam is reflected to the external object 550 and then is input to the antenna deices 521 and 522, to generate the second compensation data. The second compensation data may be generated to correspond to an extent to which the beam patterns 541, 542, and 543 are changed, based on the reflection signal. Accordingly, when the external object 550 has a structure expressed by information not included in the registration object data 560, the changes and/or distortion of the beam patterns 541, 542, and 543 by the external object 550 may be compensated by applying the second compensation data. Thus, the beam patterns 541, 542, and 543 may be restored to be similar to the beam patterns 541, 542, and 543 before the external object 550 is coupled.

Figure 7:
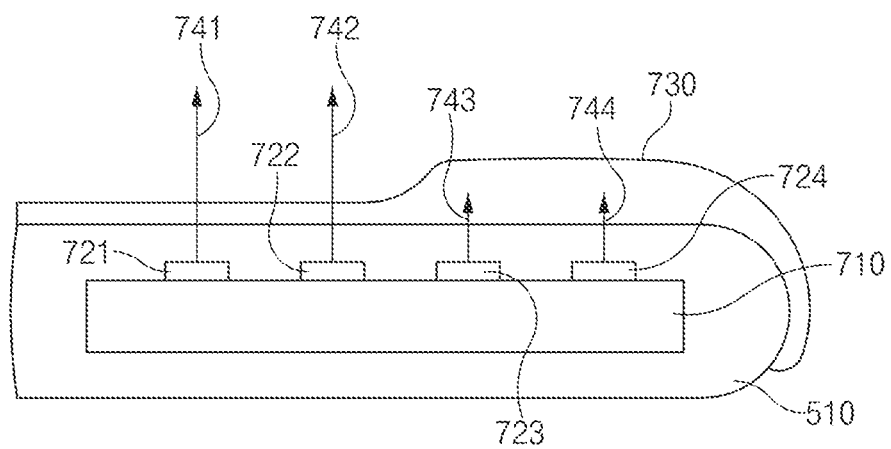
FIG. 7 illustrates antenna elements of an electronic device, to which an external object is coupled, emitting beams, according to an embodiment.

FIG. 7 illustrates antenna elements 721 to 724 of the electronic device 101, to which an external object 730 is coupled, emitting beams 741 to 744, according to an embodiment.

An antenna device, such as the first antenna device 521 or the second antenna device 522, may be positioned inside the housing 510. The antenna device 521 or 522 may include a PCB 710 and the antenna elements 721 to 724. The antenna elements 721 to 724 may be disposed on one surface of the PCB 710. The antenna elements 721 to 724 may radiate the beams 741 to 744, respectively. The beams 741 to 744 may be formed by the antenna elements 721 to 724. The beams 741 to 744 may form beam patterns, such as the beam patterns 541, 542, and 543, for transmitting and/or receiving a signal of a specified frequency.

The external object 730 may at least partially cover a surface of the housing 510. For example, the external object 730 may be a case coupled to the outside of the electronic device 101. As another example, the external object 730 may be another object, which contacts an external surface of the electronic device 101, or a user's hand gripping the electronic device 101. The external object 730 may be positioned on paths of the beams 741 to 744 formed by the antenna elements 721 to 724.

The shape of the external object 730 may be asymmetric or non-uniform. The beams 741 to 744 formed by the antenna elements 721 to 724 may be affected by the external object 730 differently from or another. For example, the beams 741 and 742 formed by the first and second antenna elements 721 and 722 among the antenna elements 721 to 724 may be formed to penetrate a thin portion of the external object 730, and thus may be less affected by the external object 730. As another example, the beams 743 and 744 formed by the third and fourth antenna elements 723 and 724 among the antenna elements 721 to 724 may be formed to penetrate a thick portion of the external object 730, and thus may be more affected by the external object 730.

An extent to which the beams 741 to 744 are changed, and/or an extent to which the beam patterns 541, 542, and 543 formed by the beams 711 to 744 are changed, may be changed depending on the influence of the external object 730. For example, as the influence of the external object 730 increases, the beams 741 to 744 may be attenuated within the external object 730. Accordingly, the intensity of each of the beam patterns 541, 542, and 543 formed by the beams 741 to 744 outside the external object 730 may decrease. As another example, as the influence of the external object 730 increases, the beams 741 to 744 may be delayed within the external object 730. Accordingly, a phase shift of each of the beam patterns 541, 542, and 543 formed by the beams 741 to 744 may increase.

Figure 8:
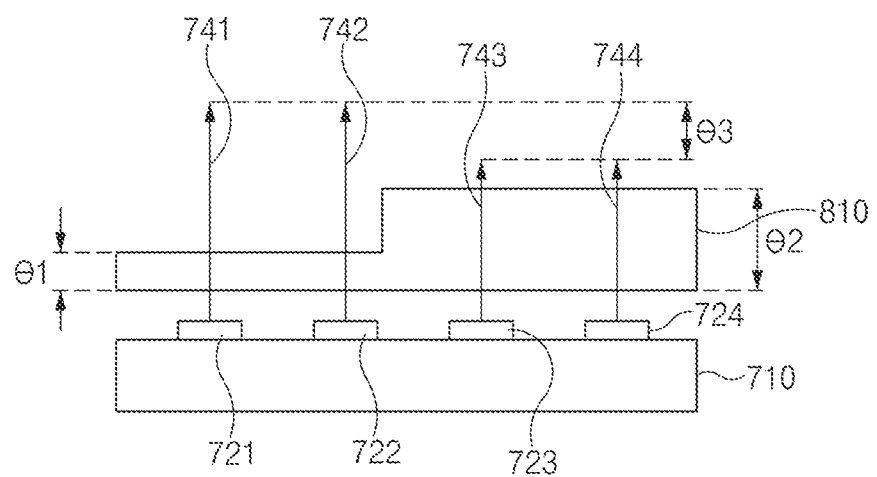
FIG. 8 illustrates phases of beams emitted by antenna elements that are changed depending on an external object, according to an embodiment.

FIG. 8 illustrates phases of beams emitted by the antenna elements 721 to 724 being changed depending on an external object 810, according to an embodiment.

The external object 810 may be positioned to overlap the beams 741 to 744 emitted by the antenna elements 721 to 724. The thickness of the external object 810 may be different for each location of the antenna elements 721 to 724. For example, the external object 810 disposed on the first and second antenna elements 721 and 722 among the antenna elements 721 to 724 may have a thin thickness. The external object 810 disposed on the third and fourth antenna elements 723 and 724 among the antenna elements 721 to 724 may have a thick thickness. As another example, the relative permittivity of the external object 810 may be different for each location of the antenna elements 721 to 724.

The beams 741 to 744 formed by the antenna elements 721 to 724 to transmit and/or receive a signal of a specified frequency may have different phase changes depending on the thickness and/or relative permittivity of the external object 810, respectively. The phase change may be determined depending on the thickness of the external object 810 and/or the relative permittivity of the external object 810. For example, each of the beams 741 and 742 formed by the first and second antenna elements 721 and 722 among the antenna elements 721 to 724 may have a first phase change θ1. As another example, each of the beams 743 and 744 formed by the third and fourth antenna elements 723 and 724 among the antenna elements 721 to 724 may have a second phase change θ2.

When phases of the beams 741 and 742 formed by the first and second antenna elements 721 and 722 are changed by the external object 810 by the first phase change θ1, and phases of the beams 743 and 744 formed by the third and fourth antenna elements 723 and 724 are changed by the external object 810 by the second phase change θ2, phases of the beams 741 to 744 may be changed to be different from one another. For example, assuming that a difference between the first phase change θ1 and the second phase change θ2 is a third phase change θ3, when the beams 741 to 744 of the same phase are output from the antenna elements 721 to 724, a difference between phases of beams output by the first and second antenna elements 721 and 722 and phases of beams output by the third and fourth antenna elements 723 and 724 may be the third phase change θ3 outside the electronic device 101.

When phases of the beams 741 to 744 outside the electronic device 101 are changed to be different from one another, directions and/or shapes of the beam patterns 541, 542, and 543 formed by the beams 741 to 744 may be changed. For example, when phases of the beams 741 and 742 formed by the first and second antenna elements 721 and 722 are changed faster than phases of the beams 743 and 744 formed by the third and fourth antenna elements 723 and 724, the beam patterns 541, 542, and 543 may be formed to be biased toward the first and second antenna elements 721 and 722.

Accordingly, as compared to a case that the external object 810 is not present, the beam patterns 541, 542, and 543 may be distorted, and thus the communication environment may be changed or a communication channel may be prevented from being established.

When outputs of the beams 741 to 744 are changed by reflecting the changes of the phases of the beams 741 to 741 by the external object 810 in advance, a beam pattern may be formed substantially the same as a beam pattern in a case that the external object 810 is not present. When data, an extent to which phases of the beams 741 to 744 are changed, is stored in advance in the memory 130 of the electronic device 101, the data on the degree of change may be used as compensation data.

When outputs of the beams 741 to 744 are changed to compensate for the changes of the phases of the beams 741 to 744 by the external object 810, a beam pattern may be formed substantially the same as a beam pattern in a case that the external object 810 is not present. When being capable of measuring an extent to which the beams 741 to 744 are changed, the communication circuit 530 and/or a sensor included in the sensor module 176 of the electronic device 101 may measure the extent to which the beams 741 to 744 are changed, and phase changes of the beams 741 to 744 may be calculated based on an extent to which the beams 741 to 744 are changed. For example, when it is identified that phases of the beams 741 and 742 output by the first and second antenna elements 721 and 722 are more advanced than phases of the beams 743 and 744 output by the third and fourth antenna elements 723 and 724, the phases of the beams 741 and 742 output from the first and second antenna elements 721 and 722 may be delayed, or the phases of the beams 743 and 744 output from the third and fourth antenna elements 723 and 724 may be advanced. In this case, the beam patterns 541, 542, and 543 that are substantially identical to beam patterns output by the beams 741 to 744, which have the same phase as each other and which are emitted by the antenna, elements 721 to 724, may be formed outside the external object 810.

Figure 9:
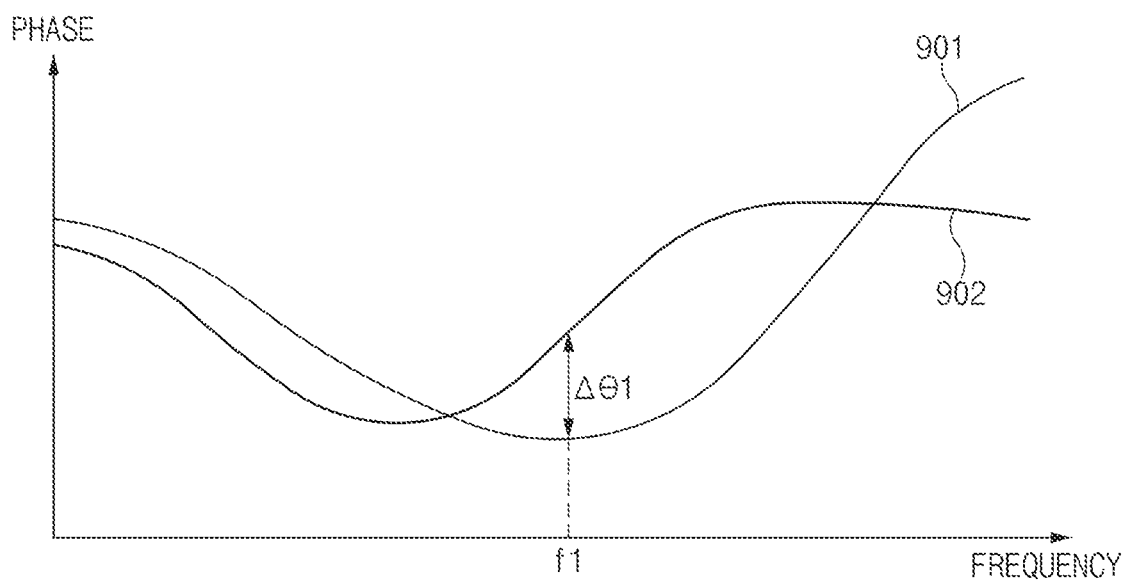
FIG. 9 is a graph illustrating a conduction phase difference of a beam emitted by an antenna device, according to an embodiment.

FIG. 9 is a graph illustrating a conduction phase difference Δθ1 of a beam emitted by an antenna device, according to an embodiment. A conduction phase may be a phase of a signal before being output from the antenna device to the outside. The conduction phase may be measured in a self-term phase method of measuring a phase of the beam that is misaligned with respect to an S parameter and/or a reference beam in the antenna elements 721 to 724. The S parameter, also known as scattering parameter, is the coefficient of a ratio of input waves and output waves. The coefficient of the S parameter includes a transmission coefficient and a reflection coefficient.

The antenna elements 721 to 724 of the electronic device 101 before an external object 730 is coupled may have a first conduction phase 901 depending on a frequency. The first conduction phase 901 may have a phase changed as the frequency is changed. For example, the first conduction phase 901 may be set to have the closest phase value to the reference phase at the first frequency f1 and to increase a difference from a reference phase as a frequency goes beyond the first frequency f1. In this case, the first frequency f1 may be a center frequency at which a main beam pattern is formed.

After the external object 730 is coupled, the antenna elements 721 to 724 of the electronic device 101 may have the second conduction phase 902 depending on the frequency. As the frequency is changed, the second conduction phase 902 may be changed to be different from the first conduction phase 901.

The conduction phase difference $\Delta\theta 1$ between the first conduction phase 901 and the second conduction phase 902 may be present at the first frequency f1. The conduction phase difference $\Delta\theta 1$ may be a physical value associated with a phase difference between beam patterns and/or an extent to which a beam pattern is changed. Accordingly, the phase difference between beam patterns and/or the extent to which a beam pattern is changed may be calculated based on the conduction phase difference $\Delta\theta 1$.

Figure 10:
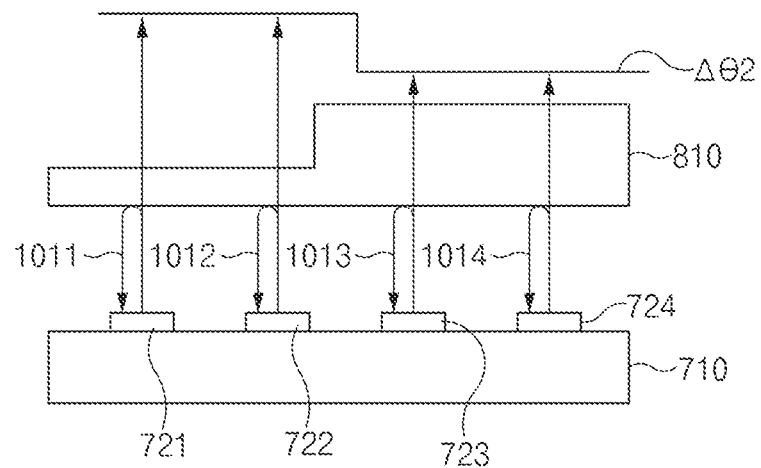
FIG. 10 illustrates a radiation wave phase difference and reflection signals of an antenna device, according to an embodiment.

FIG. 10 illustrates a radiation wave phase difference $\Delta\theta 2$ and reflection signals 1011 to 1014 of an antenna device, according to an embodiment.

The radiation wave phase difference $\Delta\theta 2$ may be a difference value between actual phases of beam patterns formed by beams output by the antenna elements 721 to 724 at locations corresponding to the antenna elements 721 to 724 outside of the external object 810. When the external object 810 has a structure other than a registration structure, such as the registration structure 560, compensation data (e.g., the second compensation data) for compensating for an extent to which a beam is changed, may be generated by calculating the radiation wave phase difference $\Delta\theta 2$. The radiation wave phase difference $\Delta\theta 2$ may be calculated based on reflection signals 1011 to 1014.

The reflection signals 1011 to 1014 may include first to fourth reflection signals 1011 to 1014. The reflection signals 1011 to 1014 may be signals output by the antenna elements 721 to 724 and/or signals obtained as a beam is reflected from the external object 810 and then is input to the antenna elements 721 to 724. For example, the reflection signals 1011 to 1014 may be signals obtained as signals output from the antenna elements 721 to 724 are reflected from the external object 810 and then are reflected again to the corresponding antenna elements 721 to 724, respectively. However, the disclosure is not limited thereto. The first reflection signal 1011 may be a signal obtained by combining a signal, which is obtained as a signal output from the first antenna element 721 is reflected from the external object 810 and then is propagated to the first antenna element 721, and a signal obtained as a signal output from the second antenna element 722 adjacent to the first antenna element 721 is reflected from the external object 810 and then is propagated to the first antenna element 721.

When the shape and/or nature of the external object 810 is unknown, or when the conduction phase difference $\Delta\theta 1$ caused by the external object 810 is unknown, the conduction phase difference $\Delta\theta 1$ may be calculated by using the reflection signals 1011 to 1014. The reflection signals 1011 to 1014 may be reflected from an external surface of the external object 810. The reflection signals 1011 to 1014, which are incident on the external object 810, are reflected from the external surface of the external object 810, and are input to the antenna elements 721 to 724, may pass through the inside of the external object 810 twice. Accordingly, a value obtained by dividing phase changes of the reflection signals 1011 to 1014 by 2 may be the conduction phase difference $\Delta\theta 1$.

The phase difference conversion data may be data for converting the conduction phase difference $\Delta\theta 1$ into the radiation wave phase difference $\Delta\theta 2$. For example, the phase difference conversion data may be a table indicating a relative ratio of the radiation wave phase difference $\Delta\theta 2$ to the conduction phase difference $\Delta\theta 1$ according to a specified condition and/or environment. The specified condition and/or environment may include the relative permittivity of the external object 810 and/or the thickness of the external object 810. Table 1 shown below indicates the relative ratio of the radiation wave phase difference $\Delta\theta 2$ to the conduction phase difference $\Delta\theta 1$ according to the thickness and relative permittivity of the external object 810.

TABLE 1

| | $\Delta\theta 2/\Delta\theta 1$ according to conditions | | |
|---|---|---|---|
| | External object thickness | | |
| Relative permittivity | 1 mm | 1.5 mm | 2 mm |
| 2.5 | 1.6 | 2.1 | 2.6 |
| 3 | 0.6 | 1.1 | 1.5 |
| 3.5 | 0.2 | 0.5 | 0.9 |

When the conduction phase difference $\Delta\theta 1$ of the external object 810 is calculated by using the reflection signals 1011 to 1014, the radiation wave phase difference $\Delta\theta 2$ may be calculated by using the phase difference conversion data stored in the memory 130. For example, when the relative permittivity of the external object 810 is about 3 and when the thickness of the external object 810 is about 1.5 mm, the radiation wave phase difference $\Delta\theta 2$ may be about 1.1 times the conduction phase difference $\Delta\theta 1$. Accordingly, the radiation wave phase difference $\Delta\theta 2$ relative to the calculated conduction phase difference $\Delta\theta 1$ may be calculated with respect to the external object 810 other than the registered structure.

Phase difference conversion data may be stored in the memory 130 in the form of a look up table (LUT). For example, due to the physical properties of a dielectric, the ratio of the radiation wave phase difference $\Delta\theta 2$ to the conduction phase difference $\Delta\theta 1$ may not be proportional to any one condition and may be determined by various conditions. To accurately compensate for the radiation wave phase difference $\Delta\theta 2$ caused by the external object 810 other than the registration structure, the ratio of the radiation wave phase difference $\Delta\theta 2$ to the conduction phase difference $\Delta\theta 1$ for various cases may be measured in advance and may be stored in the memory 130 in the form of a table. When a specified condition is satisfied, a ratio under the specified condition may be applied.

The phase difference conversion data may be stored in the memory 130 in the form of an equation. As another example, when a large amount of data is not separately stored in the memory 130 to compensate for the radiation wave phase difference $\Delta\theta2$ caused by the external object 810, it may be assumed that the ratio of the radiation wave phase difference $\Delta\theta2$ to the conduction phase difference $\Delta\theta1$ is proportional to a specific condition. At this time, specific conditions may be assigned as coefficients or variables constituting the equation, and the corresponding equation may be set to be collectively applied to the external object 810 other than the registration structure.

Figure 11:
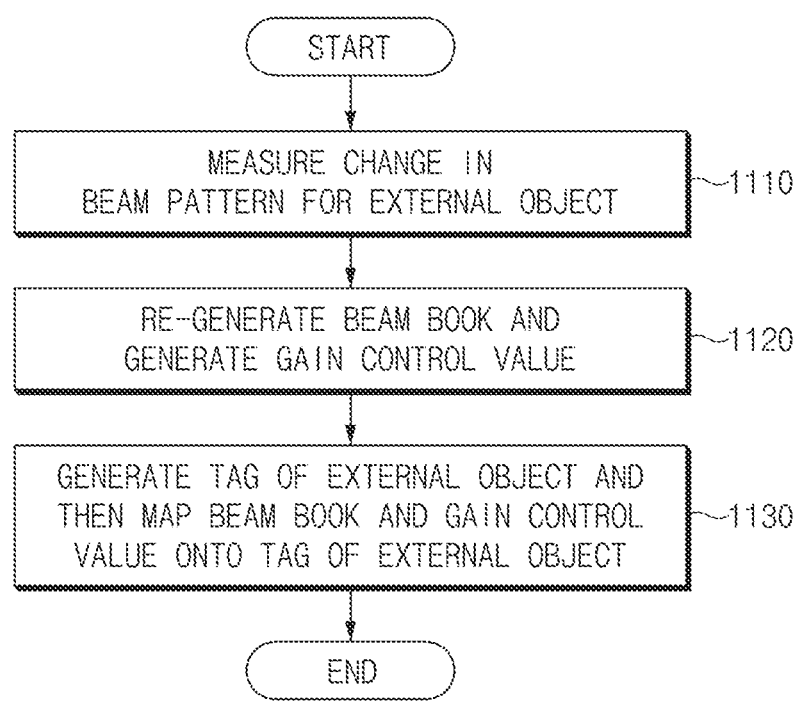
FIG. 11 is a flowchart illustrating a method, in which an electronic device maps a beam book and a gain control value, which correspond to a change in a beam pattern, according to an embodiment.

FIG. 11 is a flowchart illustrating a method, in which the electronic device 101 maps a beam book and a gain control value, which correspond to a change in a beam pattern, according to an embodiment.

In step 1110, the electronic device 101 may measure a change in a beam pattern for an external object 550. The electronic device 101 may determine whether the external object 550 is connected or attached, by using a sensor included in the sensor module 176, a communication circuit 530, and/or NFC. The processor 120 of the electronic device 101 may recognize that the external object 550 is coupled or attached, and then may identify the type of the external object 550. The processor 120 may determine whether the external object 550 corresponds to a registration structure 560. For example, when a case covering at least part of an external surface of housing 510 of the electronic device 101 is coupled or attached, the processor 120 may recognize the tag of the case by using NFC and then may identify the model name of the case.

In step 1120, the electronic device 101 ma re-generate a beam book and may generate a gain control value. The beam book may be data storing an extent to which the beam patterns 541, 542, and 543 according to the registration structure 560 are changed. The gain control value may be a value for changing outputs from the antenna elements 721 to 724 to compensate for the extent to which the beam patterns 541, 542, and 543 are changed. Whenever the external object 550 is identified, the processor 120 may re-generate the beam book for the external object 550. The processor 120 may calculate output values of the antenna elements 721 to 724 for restoring an extent to which the beam patterns 541, 542, and 543 of the beam book are changed, and then may calculate a gain control value.

In step 1130, the electronic device 101 may generate the tag of the external object 550, and then may map a beam book and a gain control value onto a tag of an external object. The processor 120 may identify the type and/or shape of the external object 550 and then may assign a tag capable of identifying the type and/or shape of the external object 550. For example, when the external object 550 is a case, the processor 120 may generate a tag and may assign the tag to each model name of the case. The processor 120 may generate registration information 560 by mapping the beam book and the gain control value onto the generated tag of the external object. The processor 120 may store the generated registration information 560 in the memory 130.

Figure 12:
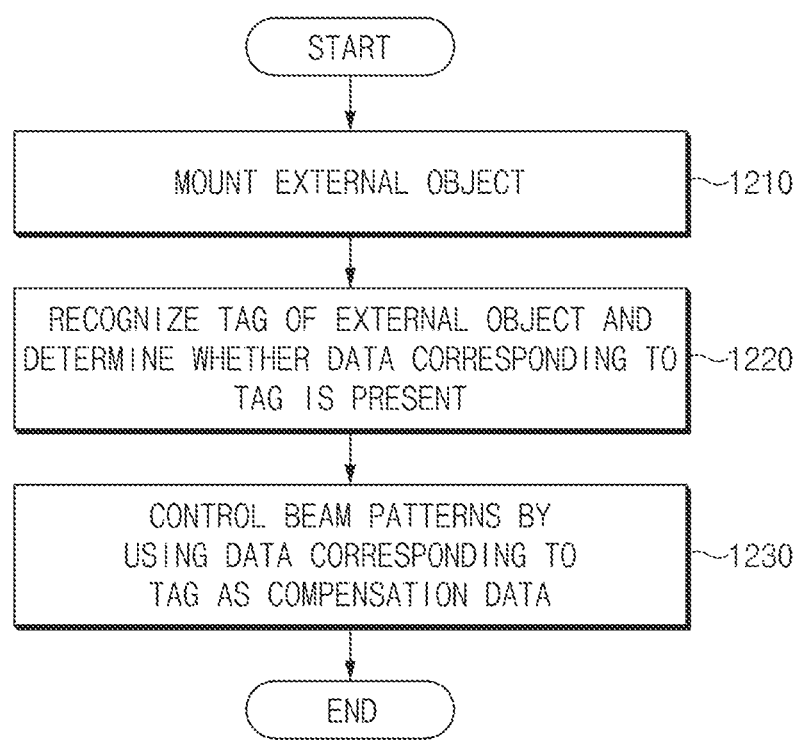
FIG. 12 is a flowchart illustrating a method of controlling beam patterns of an antenna device, according to an embodiment.

FIG. 12 is a flowchart illustrating a method of controlling beam patterns 541 to 543 of an antenna device, according to an embodiment.

In step 1210, the electronic device 101 may mount an external object 730. For example, the electronic device 101 may mount a case that protects the housing 510 from impact by covering an external surface of the housing 510 of the electronic device 101. As another example, the electronic device 101 may mount the external object 550 that contacts the external surface of the housing 510 of the electronic device 101. As another example, when a user grips the external surface of the housing 510 of the electronic device 101, the electronic device 101 may recognize the user's grip as the external object 550.

In step 1220, the electronic device 101 may recognize a tag of the external object 550 and may determine whether data corresponding to the tag is present. For example, when the electronic device 101 mounts a case, the electronic device 101 may recognize the tag of the case by using NFC and may determine whether the mounted case corresponds to one of the registration structures 560. As another example, the electronic, device 101 may recognize the tag of the external object 550, which contacts the external surface of the housing 510 of the electronic device 101, by using the communication circuit 530 and then may determine whether the external object 550 corresponds to one of the registration structures 560.

In step 1230, the electronic device 101 may control the beam patterns 541, 542, and 543 by using data corresponding to the tag as compensation data (e.g., the first compensation data stored in the memory 130). When the external object 550 identified by the tag corresponds to one of the registration structures 560, the electronic device 101 may use a beam book and/or a gain control value, which is mapped onto the corresponding registration structure 560, as the compensation data. The processor 120 may grasp an extent, to which the beam patterns 541, 542, and 543 are changed by the external object 550, by using the beam book stored in the memory 130. The processor 120 may restore the changed beam patterns 541, 542, and 543 such that shapes of the changed beam patterns 541, 542, and 543 are substantially the same original shapes, by charging the output value of the antenna device 521 or 522 based on the gain control value stored in the memory 130.

Figure 13:
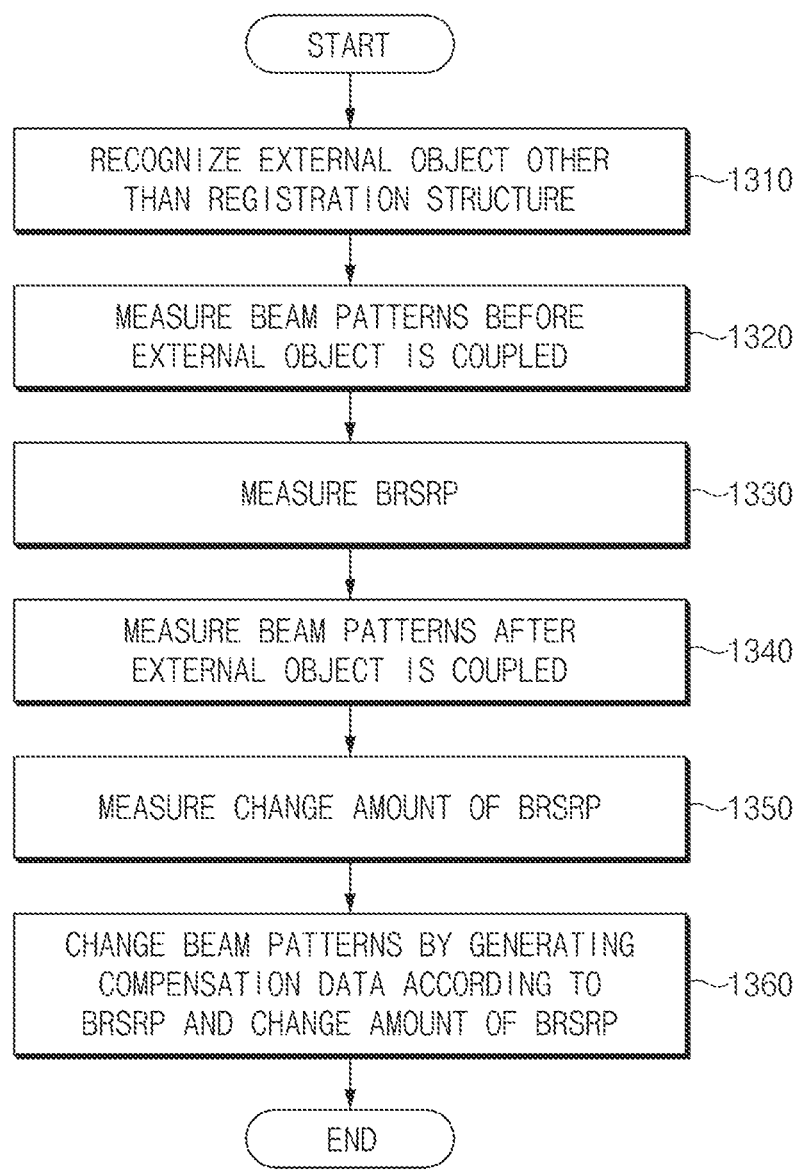
FIG. 13 is a flowchart illustrating a method of changing beam patterns of an electronic device, to which an external object other than a registration structure is coupled, according to an embodiment.

FIG. 13 is a flowchart illustrating a method of changing the beam patterns 541 to 543 of the electronic device 101, to which the external object 550 other than the registration structure 560 is coupled, according to an embodiment.

In step 1310, the electronic device 101 may recognize the external object 550 other than the registration structure 560. The electronic device 101 may recognize the tag of the external object 550 or may measure an extent to which the beam patterns 541 to 543 are changed because the external object 550 is coupled. When it is determined that the tag of the external object 550 corresponds to a model name other than the registration structure 560, or the change in the beam patterns 541 to 543 is different from the change in the beam patterns 541 to 543 by the registration structure 560, the processor 120 may determine that the external object 550 is a structure other than the registration structure 560.

In step 1320, the electronic device 101 may measure the beam patterns 541, 542, and 543 before the external object 550 is coupled. The electronic device 101 may measure, in advance, the shape, intensity, and/or phase of each of the beam patterns 541, 542, and 543, in a state where the external object 550 is not present, by using the communication circuit 530 and/or a sensor included in the sensor module 176. The electronic device 101 may store information about the measured beam patterns 541, 542, and 543 in the memory 130.

In step 1330, the electronic device 101 may measure a beam reference signal received power (BRSRP). The BRSRP may be power generated by a reference signal received by the antenna device 521 or 522 in a state where the electronic device 101 is positioned an a free space. The electronic device 101 may measure the BRSRP based on information about the measured beam patterns 541, 542, and 543. The BRSRP measured in step 1330 may be a value before the external object 550 is coupled. The electronic device 101 may store the measured BRSRP in the memory 130.

In step 1340, the electronic device 101 may measure the beam patterns 541, 542, and 543 after the external object 550 is coupled. The electronic device 101 may measure the shape, intensity, and/or phase of each of the beam patterns 541, 542, and 543, in a state where the external object 550 is coupled, by using the communication circuit 530 and/or a sensor included in the sensor module 176. The electronic device 101 may store information about the measured beam patterns 541, 542, and 543 in the memory 130.

In step 1350, the electronic device 101 may measure the change amount of BRSRP. The electronic device 101 may measure the BRSRP again based on the information about the beam patterns 541, 542, and 543 measured after the external object 550 is coupled. The electronic device 101 may compare BRSRP, which is measured after the external object 550 is coupled, with BRSRP which is measured in step 1330 before the external object 550 is coupled. The electronic device 101 may calculate a difference value between the two BRSRPs as the change amount of BRSRP.

In step 1360, the electronic device 101 may change the beam patterns 541, 542, and 543 by generating compensation data (e.g., second compensation data) according to the BRSRP and the change amount of BRSRP. The processor 120 may calculate an extent to which the beam patterns 541, 542, and 543 are changed by the external object 550, by using BRSRP and the change amount of BRSRP after the external object 550 is coupled. The processor 120 may calculate a gain control value for changing the output of each of the antenna elements 721 to 724 to compensate for the changed beam patterns 541, 542, and 543. The processor 120 may form the beam patterns 541, 542, and 543 so as to be substantially the same as before the external object 550 is coupled, by changing the output of each of the antenna elements 721 to 724.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed its the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a e entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or n ore functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in fort r and details may be made therein without departing from the spirit and scope of the disclosure as defined by the appended claims and their equivalents.

The invention claimed is:

1. An electronic device comprising:
   a housing;
   an antenna device including at least one antenna element disposed on one surface or inside of a printed circuit board disposed inside the housing and a radio frequency integrated chip (RFIC) for processing a signal in a frequency band, which is transmitted and/or received through the at least one antenna element;
   a communication circuit;
   a memory; and
   a processor operationally connected to the antenna device, the communication circuit, and the memory,
   wherein the processor is configured to:
      detect an external object, which contacts at least part of the housing, based on a change in a beam pattern of a beam formed by the antenna device;
      determine whether at least some information of the external object is information included in registration object data stored in the memory; and
      when the at least some information of the external object is included in the registration object data, change the beam pattern by using first compensation data, which is stored in the registration object data and which is changed depending on a registration structure corresponding to the external object.

2. The electronic device of claim 1, wherein the processor is further configured to:
   when the at least some information of the external object is not included in the registration object data, identify a degree of change of the beam pattern by using a reflection signal, which is obtained as the beam is reflected from the external object and then is input to the antenna device; and
   change the beam pattern by generating second compensation data corresponding to the degree of change.

3. The electronic device of claim 2, wherein the processor is further configured to:
   adjust an output magnitude and/or a phase of the at least one antenna element individually by applying the second compensation data.

4. The electronic device of claim 2, wherein the second compensation data is generated by using beam reference signal received power (BRSRP) measured by the at least one antenna element, and
   wherein the second compensation data includes a specific range and a change value of the BRSRP.

5. The electronic device of claim 1, wherein the external object is a case that at least partially covers an external surface of the housing, and
   wherein the processor is further configured to:
      identify a type and/or a model name of the case by using establishment of a wireless communication channel through the communication circuit, a sensor included in the electronic device, and/or a near field communication (NFC) function of the electronic device.

6. The electronic device of claim 1, wherein the processor is further configured to:
   adjust an output magnitude and/or a phase of the at least one antenna element individually by applying the first compensation data.

7. The electronic device of claim 1, wherein, when the at least some information of the external object is not included in the registration object data, the beam includes a first signal output by a first antenna element and a second signal output by a second antenna element adjacent to the first antenna element from among the at least one antenna element, and
   wherein the processor is further configured to:
      when the first signal and the second signal are reflected from the external object and then are input to the antenna device, calculate a conduction phase difference of the beam pattern by using a first reflection signal input to the first antenna element and a second reflection signal input to the second antenna element.

8. The electronic device of claim 7, wherein the processor is further configured to:
   calculate a radiation wave phase difference based on the conduction phase difference and phase difference conversion data stored in the memory.

9. The electronic device of claim 1, wherein the first compensation data includes a beam book and/or a gain control value corresponding to the registration structure stored in the memory.

10. A method of changing a beam pattern of an antenna device, the method comprising:
    detecting an external object, which contacts at least part of a housing of an electronic device, based on a change in a beam pattern formed by the antenna device;
    determining whether at least some information of the external object is information included in registration object data stored in a memory of the electronic device; and
    when the at least some information of the external object is included in the registration object data, changing the changed beam pattern by using first compensation data, which is set in the registration object data and which is used to compensate for the change of the beam pattern due to a registration structure.

11. The method of claim 10, further comprising:
    when the at least some information of the external object is not included in the registration object data,
    identifying a degree of change of the beam pattern by using a reflection signal, which is obtained as the beam is reflected from the external object and then is input to the antenna device; and
    changing the beam pattern by generating second compensation data corresponding to the degree of change.

12. The method of claim 11, wherein changing the beam pattern by generating the second compensation data further includes:
    adjusting an output magnitude and/or a phase of the at least one antenna element individually by applying the second compensation data.

13. The method of claim 11, wherein, when the at least some information of the external object is not included in the registration object data, the beam includes a first signal output by a first antenna element and a second signal output by a second antenna element adjacent to the first antenna element from among the at least one antenna element,
    the method further comprising:
    when the first signal and the second signal are reflected from the external object and then are input to the antenna device, calculating a conduction phase difference of the beam pattern by using a first reflection signal input to the first antenna element and a second reflection signal input to the second antenna element.

14. The method of claim 11, wherein the first compensation data includes a beam book and/or a gain control value corresponding to the registration structure stored in the memory, wherein the second compensation data is generated by using beam reference signal received power (BRSRP) measured by the at least one antenna element, and wherein the second compensation data includes a specific range and a change value of the BRSRP.

15. The method of claim 10, wherein changing the changed beam pattern by using the first compensation data further includes:

adjusting an output magnitude and/or a phase of the at least one antenna element individually by applying the first compensation data.

\* \* \* \* \*